United States Patent [19]

McGuire

[11] Patent Number: 5,263,684
[45] Date of Patent: Nov. 23, 1993

[54] FOOT-OPERATED FAUCET CONTROL

[76] Inventor: Michael P. McGuire, 10223-278th Ave. P.O. Box 126, Camp Lake, Wis. 53109

[21] Appl. No.: 408,202

[22] Filed: Sep. 18, 1989

[51] Int. Cl.⁵ ............................................. F16K 31/62
[52] U.S. Cl. ...................... 251/294; 251/295; 251/288
[58] Field of Search .................. 251/295, 294, 288; 4/308, 280; 222/179; 74/512, 560

[56] References Cited

U.S. PATENT DOCUMENTS

| | | | |
|---|---|---|---|
| 289,937 | 12/1883 | Smith | 251/295 X |
| 598,035 | 1/1898 | Towle | 222/179 X |
| 1,034,911 | 8/1912 | Hagman | 251/295 X |
| 1,093,452 | 4/1914 | Metcalf | 251/295 X |
| 1,754,259 | 4/1930 | Brown et al. | 222/179 X |
| 2,264,876 | 12/1941 | Hackley | 251/295 X |
| 2,270,239 | 1/1942 | Cushman | 251/295 X |
| 2,830,618 | 4/1958 | Mitchell | 251/295 X |
| 4,427,177 | 1/1984 | Constantinescu et al. | 251/294 X |

*Primary Examiner*—John Rivell
*Attorney, Agent, or Firm*—Roger A. Marrs

[57] ABSTRACT

A foot-operated control for adjusting a water faucet valve mechanism is disclosed herein having a turning mechanism coupled to a faucet valve in a water line responsive to a foot pedal or treadle for selectively opening and closing the valve to control the flow of water therethrough. Examples of a turning mechanism may be a looped cord about a drum or a lever arm attached to the valve, either of which is operated by a push rod or cable actuated by the foot pedal or treadle.

2 Claims, 1 Drawing Sheet

FOOT-OPERATED FAUCET CONTROL

BACKGROUND OF THE INVENTION

1. Field of the Invention

The present invention relates to faucet valve controls and more particularly to a novel foot control for selectively turning pressurized water on and of through a conduit so that hand-free use of a washbasin is available.

2. Brief Description of the Prior Art

In the past, it has been the conventional practice to individually turn on water faucets associated with a discharge nozzle of a sink basin through the use of the user's hands. However, when the hands are soapy or employed for other purposes, it is not possible to conveniently close the valves to shut down the water supply or otherwise alter the water supply. In some instances, foot-operated devices have been provided which are coupled to the faucet via a combination of pivoting linkages. These are used mostly in hospitals, clinics or the like for sanitary purposes and such devices are extremely expensive, difficult to maintain and cumbersome to install.

Therefore, a long standing need has existed to provide a relatively inexpensive and convenient control for modifying the flow of pressurized water through water conduits which readily may be installed without specialized tools or special skills.

SUMMARY OF THE INVENTION

Accordingly, the above problems and difficulties are obviated by the present invention which provides a foot-operated control for adjusting pressurized water being conducted through a conduit having a valve mechanism installed in the conduit with a movable element for controlling the flow of water therethrough. Movement of the element is in accordance and in response to a foot pedal or treadle having positions of closure between full open and full close. The movement of the element is in response to the foot pedal and, therefore, follows through a range of movement from full open to full close at the selection of the user by depression or release of the foot treadle. Preferably, the foot pedal or treadle is resiliently constructed so that a portion moves in response to the application of foot pressure by the user and is normally biased by a spring to an opposite position. A cable is operably connected between the movable element of the treadle and the movable element of the valve mechanism wherein in one instance, the movable element of the valve mechanism takes the form of a drum having a line or wire trained thereabout so as to turn in the direction of cable pull. The line or wire is biased in an opposite direction to return or move the valve mechanism movable element in the opposite direction from the cable pull. In another form, the valve mechanism includes a cantilevered control arm which is connected at its free end to the cable via a sleeve which slides on the arm so that movement of the foot pedal is translated into a pivoting movement of the arm and the valve movable element.

In either instance, the movable valve element includes a port which is selectively placed in alignment with the passageway of the conduit conducting the pressurized water. Therefore, movement of the element will shut the source of water off, on or modify the flow as the area of port and passageway alignment is reduced.

Therefore, it is among the primary objects of the present invention to provide a novel foot control for operating a water valve which is convenient to install and which may be readily operated by the foot of the user.

Another object of the present invention is to provide a novel foot control mechanism for moving a moving valve element that may readily be attached to a foot pedal so that linear movement is translated into rotational movement and control of the valve element.

Still another object of the present invention is to provide a novel foot control mechanism for adjusting a water valve mechanism for regulating or controlling the conduct of pressurized water through a conduit.

Still a further object of the present invention is to provide a novel foot-operated faucet control for modifying the conduct of pressurized water through a conduit, employing a foot pedal, a cable linkage and a rotating valve element operable in response to movement of the cable via the foot pedal.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
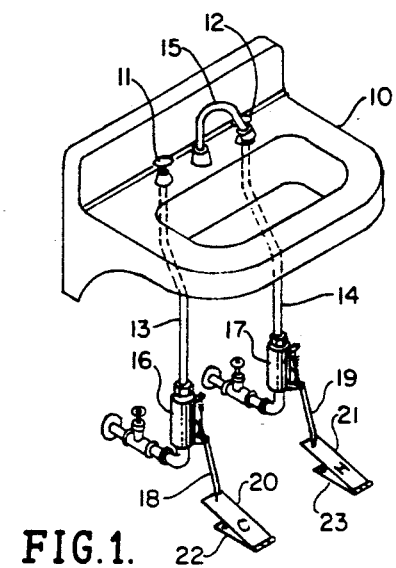
FIG. 1 is a front perspective view of a typical washbasin having faucets controlled by the inventive foot-operated control system.

Referring to FIG. 1, a typical washbasin is indicated by the numeral 10 which includes faucets 11 and 12 for regulating hot and cold water supplied from a pressurized source through conduits 13 and 14. The discharge of the water is through a nozzle 15. However, control of the pressurized water through the conduits 13 and 14 is under regulation by valve mechanisms 16 and 17 which incorporate the inventive concept.

Each of the valve mechanisms 16 and 17 include a movable element which is actuated in response to linear movements of a wire or cable 18 or 19 respectively with reference to the valve mechanisms 16 and 17. The wire or cable is moved by a pedal 20 and 21 associated with foot treadles 22 and 23 resting on the ground or floor. In some instances, the treadles are attached to the floor so as to be in a stationary and fixed position. It is to be understood that although a pair of valve mechanisms 16 and 17 are shown with respect to a pair of conduits 13 and 14, a single valve mechanism can be used when the conduit is connected to a common inlet of hot and cold water and in conjunction with the nozzle 15. The invention can be used separately or in combination as described.

Figure 4:
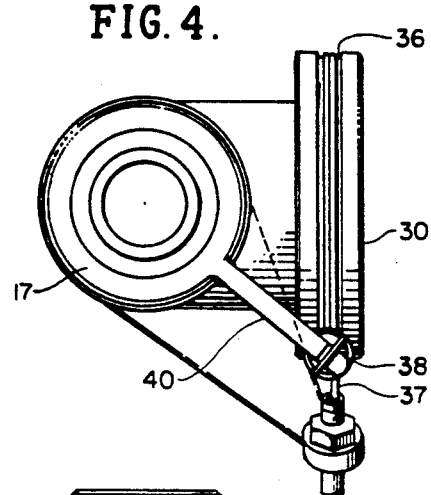
FIG. 4 is a top plan view of the valve mechanism.
Figure 3:
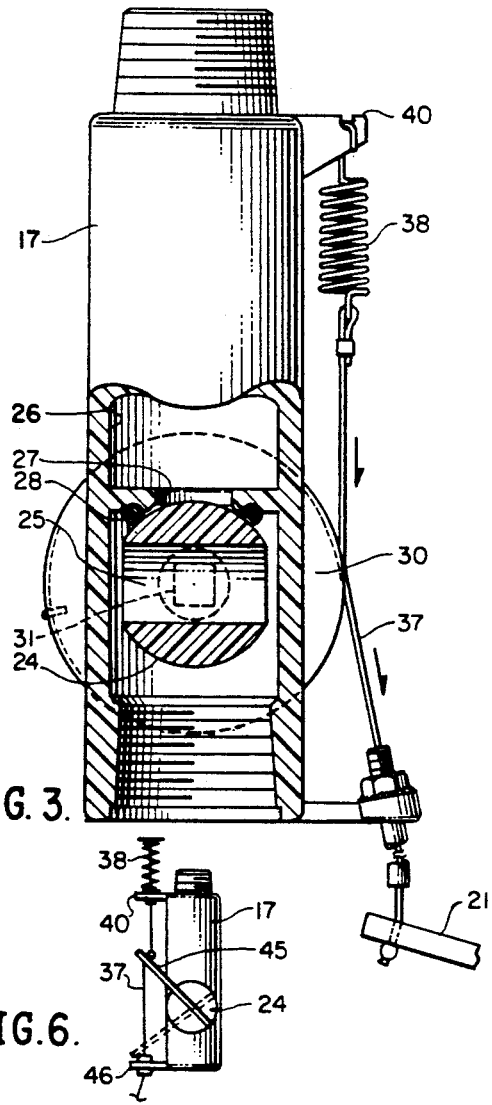
FIG. 3 is a view similar to the view of FIG. 2 as taken in the direction of arrows 3—3 thereof.
Figure 2:
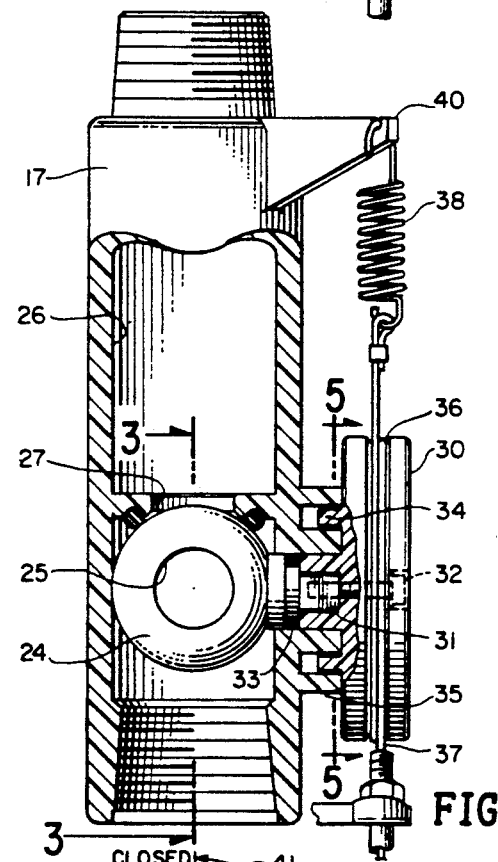
FIG. 2 is a longitudinal cross-sectional view of the inventive valve mechanism employed in the system of FIG. 1.

Referring now in detail to FIGS. 2, 3 and 4, one embodiment of the invention is illustrated wherein the valve mechanism 17 includes a movable element 24 taking the form of a ball valve having an open-ended port 25 extending therethrough. As illustrated, the port 25 is transverse or normal to the main fluid passageway of the valve mechanism and conduit wherein the passageway is indicated by numeral 26. A port 27 mates with the open end of the valve port 25 when the valve 24 is rotated to a position permitting the flow of water through the conduit in the valve. However, when the ball valve 24 is in the position as shown in FIG. 3, the port 27 is blocked and water flow is terminated. A seal 28 is employed as a resilient closure between the external portion of the ball valve 24 and the mating or conformal surface of the port seat of port 27.

As shown more clearly in FIG. 2, a drum 30 is attached to the ball valve 24 via a stem and receptacle arrangement broadly illustrated by numeral 31 which is held together by means of a screw 32. The drum 30 is seated within a recess by means of a washer 32 so that leakage will not occur. A circular guide 34 is placed in a circular groove within a standoff 35 so that the drum 30 is stabilized and properly supported on the side of the valve.

The external peripheral surface of the drum 30 is provided with a groove 36 over which a wire, line or cable is trained and is broadly identified by numeral 37. One end of the line is attached to a spring 38 which is coupled to a cantilevered arm 40 outwardly extending from the exterior of the valve body 17. The other end of the line is attached to the pedal 21 of the treadle, as shown in FIG. 3. Therefore, it can be seen that as the pedal is moved about its pivot on the treadle, the line 37 is drawn about the drum 30 so that the linear movement of the line is translated to rotational movement of the drum 30. As the drum 30 rotates, the movement is carried to the ball valve 24 which follows the rotation accordingly to either align the open-ended port 25 with the port 27 or to place the ports in nonalignment to cease the flow of fluid. Once the pressure is taken off of the pedal 21, the spring 38, which has been expanded, will retract to rotate the drum, and, therefore, the ball valve 24 to another closure position. By this means, the user can operate the foot treadle with one foot to increase or decrease the flow of fluid discharging from the nozzle 15.

Figure 5:
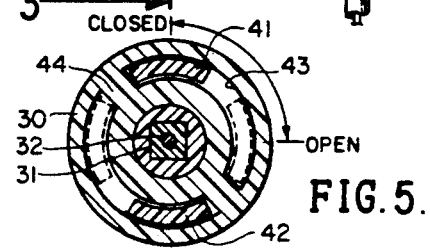
FIG. 5 is a transverse cross-sectional view of the valve mechanism shown in FIG. 2 as taken in the direction of arrows 5—5 thereof.

Referring now to FIG. 5, movement for rotation of the drum 30 is eliminated by a pair of stops 41 and 42 which travel within the circular recess identified by numeral 43. The opposite ends of the respective stops 41 and 42 will bear against a bar 44 which is stationary to the housing of the valve 17. Therefore, rotation of the drum 30 and the valve 24 is limited between the positions of stop engagement to fully open or fully close the ports.

Figure 6:
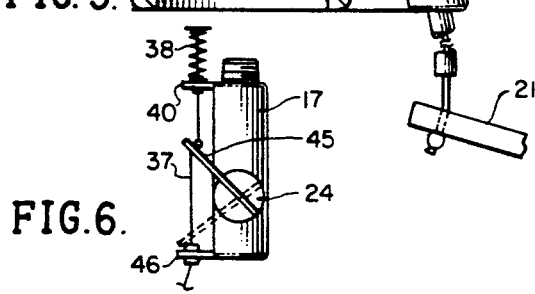
FIG. 6 is a side elevational view of another version of valve mechanism employed in the inventive system.

Referring now in detail to FIG. 6, another embodiment of the present invention is shown wherein the ball valve 24 is attached externally to a lever arm 45 that cantilevers outwardly from the side of the ball valve for attachment with the line, cable or wire 37. The opposite end of the line is attached to the spring 38. The spring normally biases the line, and, therefore, the cantilevered arm 45 to the position shown in solid lines which rotates the ball valve to its fluid closing position. When a foot pedal is depressed, the line is pulled downwardly so that the arm is moved to the position shown in broken lines which represents the open position for the valve and fluid flow.

Therefore, in view of the foregoing, it can be seen that two embodiments are shown for permitting the user to employ either one foot or the other foot to control the flow of water from the nozzle 15. Special valving can be provided so that both hot and cold water can be controlled from a single foot pedal or either the hot and cold water line can be controlled with a separate pedal as shown in FIG. 1. While the user's foot controls not only the on and off condition of water flow but regulates the amount of water discharge, the user's hands are free for conducting a washing procedure or for performing other acts. For example, the user may be using one hand for an oral hygiene device while bracing himself on the basin 10 with the other hand. Also, the user can be controlling the flow of water into glass jars or bowls which are held by both hands and loss of water is eliminated. Therefore, not only is the device of the present invention a convenient one for the user, but is also a water-saving measure eliminating waste.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a foot-operated control for actuating a movable valve in a valve body comprising the combination of:
   a water conduit having a movable element adapted to selectively conduct pressurized water therethrough;
   a foot treadle supported on a floor surface having an operative position and a non-operative position;
   means operably interconnecting said foot treadle with said movable element for moving said movable element in response to said foot treadle to conduct and non-conduct water through said conduit;
   said movable element in said non-conduct condition is in response to said foot treadle non-operative position;
   said movable element includes a drum fixedly attached to a ball valve;
   said interconnecting means includes a line trained about said drum having its opposite ends resiliently coupled to said valve body and said foot treadle respectively; and
   spring means coupled between said line and said body normally biasing said ball valve to a valve closing position.

2. In a pressurized water distribution system having a valve mechanism for selectively conducting or non-conducting the pressurized water, the combination which comprises:
   said valve mechanism having a body provided with an internal passageway for conducting the flow of pressurized water therethrough;
   a valve movable carried in said body having an open-ended port alignable with said passageway to conduct pressurized water through said port and non-alignable with said port transverse to said passageway to restrict flow of said pressurized water therethrough;

actuating means carried on said movable value for positioning said valve port between its aligned and non-aligned positions with respect to said body passageway;

a foot-operated treadle supported on the floor;

control means operably connecting said foot-operated treadle with said actuating means for selectively adjusting said movable valve port between its aligned and non-aligned positions;

said actuating means ia an element fixedly attached to said movable valve exteriorly of said body;

said control means includes a length of line coupled to said actuating means and resiliently biased to move said valve into its port non-aligned position;

said foot-operated treadle includes a base having a pedal pivotally attached thereto and said pedal attached to one end of said control line;

limit stop means cooperatively coupled between said actuating means and said valve body for limiting the movement of said actuating means and said movable valve; and said actuating means element is a disc or drum about which said line is trained so as to follow in response to pull of said line by said treadle; and spring means coupled between said valve body and said valve normally biasing said element into a non-water conducting position.

* * * * *